United States Patent [19]

Matsumoto et al.

[11] Patent Number: 4,860,026
[45] Date of Patent: Aug. 22, 1989

[54] HALFTONE IMAGE RECORDING METHOD USING RECORDING DATA HAVING A PLURALITY OF CONCENTRATIONS FOR ONE COLOR

[75] Inventors: Kentaro Matsumoto, Sagamihara; Makoto Takaoka, Atsugi; Masami Fukumoto, Sagamihara; Toyokazu Uda; Susumu Sugiura, both of Atsugi, all of Japan

[73] Assignee: Canon Kabushiki Kaisha, Tokyo, Japan

[21] Appl. No.: 210,869

[22] Filed: Jun. 24, 1988

[30] Foreign Application Priority Data

Jun. 25, 1987 [JP] Japan .................. 62-156567
Jul. 6, 1987 [JP] Japan .................. 62-166976

[51] Int. Cl.[4] ........................................... G01D 15/16
[52] U.S. Cl. .............................. 346/1.1; 346/140 R; 358/298; 358/75
[58] Field of Search ................ 346/1.1, 140; 358/298, 358/75, 80

[56] References Cited

U.S. PATENT DOCUMENTS

| | | |
|---|---|---|
| 3,742,129 | 6/1973 | Roberts et al. . |
| 3,922,484 | 11/1975 | Keller . |
| 4,052,715 | 10/1977 | Streifer . |
| 4,149,194 | 4/1979 | Holladay . |
| 4,185,304 | 1/1980 | Holladay . |
| 4,412,225 | 10/1983 | Yoshida et al. .................. 346/1.1 |
| 4,486,788 | 12/1984 | Yamada . |
| 4,531,731 | 11/1985 | Kawamura . |
| 4,533,920 | 8/1985 | Suzuki . |
| 4,533,923 | 8/1985 | Suzuki . |
| 4,551,736 | 11/1985 | Suzuki . |
| 4,635,078 | 1/1987 | Sakurada et al. .................. 346/140 |
| 4,686,538 | 8/1987 | Kouzato et al. .................. 346/1.1 |
| 4,695,846 | 9/1987 | Suzuki . |
| 4,713,701 | 12/1987 | Kawamura et al. . |
| 4,714,964 | 12/1987 | Sasaki . |
| 4,723,129 | 2/1988 | Endo . |
| 4,740,796 | 4/1988 | Endo . |

OTHER PUBLICATIONS

Stucki, P., "Electronic Halftoning for Color Reproduction", IBM Technical Disclosure Bulletin, vol. 20, No. 6, Nov. 1977, pp. 2423–2425.

Primary Examiner—Joseph W. Hartary
Attorney, Agent, or Firm—Fitzpatrick, Cella, Harper & Scinto

[57] ABSTRACT

A method for halftone image recording, wherein dots are formed using two or more concentrations of ink, to express different image densities. Each picture element may comprise a plurality of cells, different predetermined members and patterns of which are actually printed in, to express different gradations. Different such patterns may be used for each ink concentration. Several such patterns, using only thin ink, may, for example, be used to express lower densities, several others, using only thick ink, for high densities, and still others, using dots of thin ink and dots of thick ink, for intermediate densities. For color image recording, different concentrations and different members of concentrations can be used for different colors.

17 Claims, 16 Drawing Sheets

F I G. 5-1

| IMAGE DATA | LEVEL # | THIN INK DOTS | THICK INK DOTS | IMAGE DATA | LEVEL # | THIN INK DOTS | THICK INK DOTS | IMAGE DATA | LEVEL # | THIN INK DOTS | THICK INK DOTS |
|---|---|---|---|---|---|---|---|---|---|---|---|
| 0∼1 | 0 | | | 50∼53 | 12 | | | 94∼96 | 24 | | |
| 2∼6 | 1 | | | 54∼57 | 13 | | | 97∼100 | 25 | | |
| 7∼10 | 2 | | | 58∼60 | 14 | | | 101∼102 | 26 | | |
| 11∼14 | 3 | | | 61∼63 | 15 | | | 103∼105 | 27 | | |
| 15∼19 | 4 | | | 64∼65 | 16 | | | 106∼108 | 28 | | |
| 20∼24 | 5 | | | 66∼67 | 17 | | | 109∼111 | 29 | | |
| 25∼28 | 6 | | | 68∼72 | 18 | | | 112∼114 | 30 | | |
| 29∼33 | 7 | | | 73∼78 | 19 | | | 115∼117 | 31 | | |
| 34∼37 | 8 | | | 79∼83 | 20 | | | 118∼119 | 32 | | |
| 38∼41 | 9 | | | 84∼86 | 21 | | | 120∼121 | 33 | | |
| 42∼45 | 10 | | | 87∼89 | 22 | | | 122∼124 | 34 | | |
| 46∼49 | 11 | | | 90∼93 | 23 | | | 125∼126 | 35 | | |

| IMAGE DATA | LEVEL # | THIN INK DOTS | THICK INK DOTS | IMAGE DATA | LEVEL # | THIN INK DOTS | THICK INK DOTS |
|---|---|---|---|---|---|---|---|
| 0 | 0 | | | ʃ | ʃ | | |
| ʃ | 36 | | | ʃ | 50 | | |
| ʃ | 37 | | | ʃ | ʃ | | |
| ʃ | 38 | | | ʃ | ʃ | | |
| ʃ | 39 | | | ʃ | 60 | | |
| ʃ | 40 | | | ʃ | ʃ | | |
| ʃ | 41 | | | ʃ | ʃ | | |
| ʃ | 42 | | | ʃ | 70 | | |
| ʃ | 43 | | | ʃ | ʃ | | |
| ʃ | 44 | | | ʃ | ʃ | | |
| ʃ | 45 | | | ʃ | ʃ | | |
| ʃ | 46 | | | 255 | 80 | | |

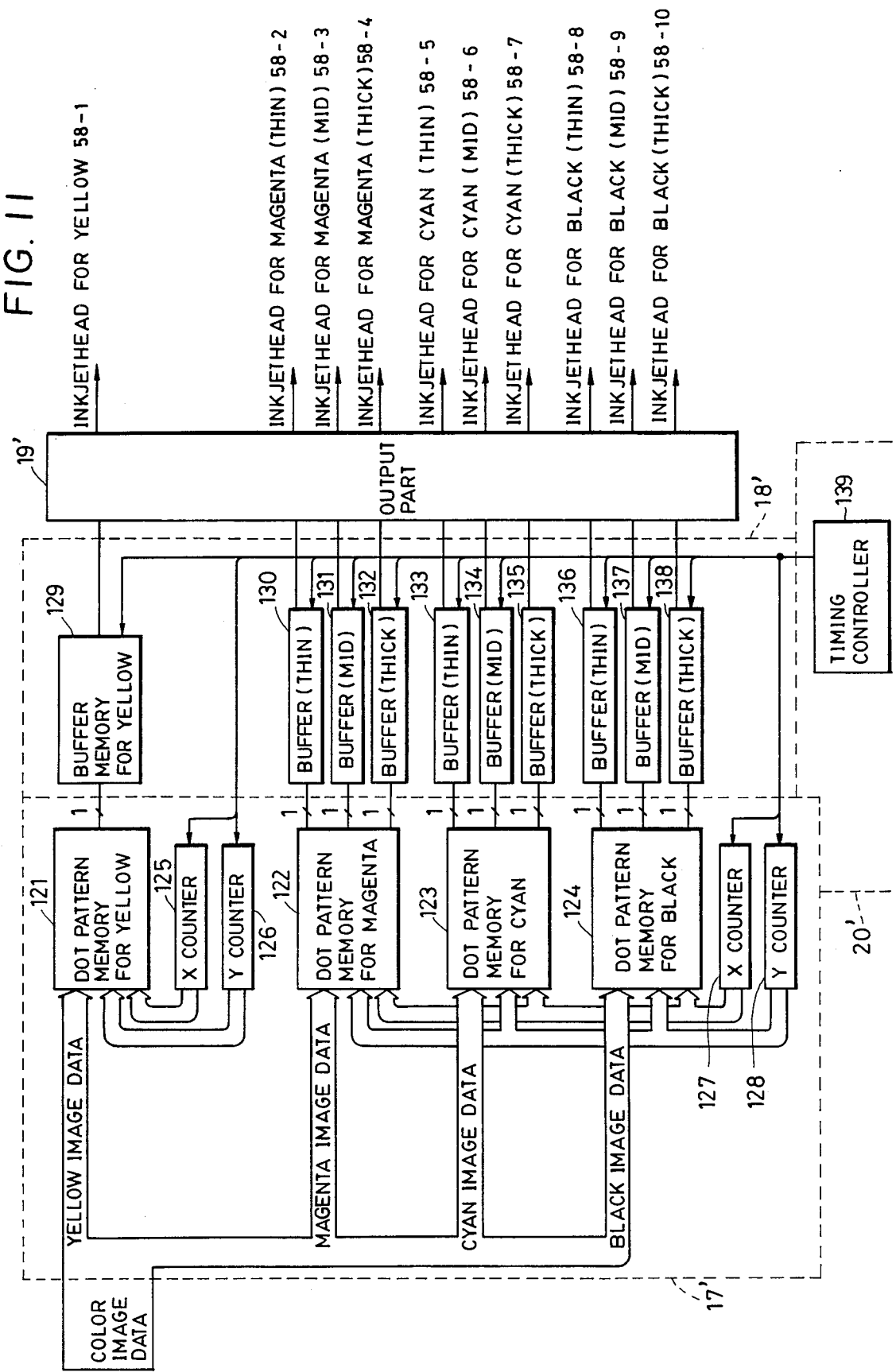

| IMAGE DATA | LEVEL # | DOT PATTERN |
|---|---|---|
| 0 ~ 6 | 0 | |
| 7 ~ 13 | 1 | |
| 14 ~ 20 | 2 | |
| 21 ~ 27 | 3 | |
| 28 ~ 34 | 4 | |
| 35 ~ 41 | 5 | |
| 42 ~ 48 | 6 | |
| 49 ~ 55 | 7 | |
| 56 ~ 62 | 8 | |
| 63 ~ 69 | 9 | |
| 70 ~ 76 | 10 | |
| 77 ~ 83 | 11 | |
| 84 ~ 89 | 12 | |
| 90 ~ 96 | 13 | |
| 97 ~ 103 | 14 | |
| 104 ~ 110 | 15 | |
| 111 ~ 117 | 16 | |
| 118 ~ 124 | 17 | |
| 125 ~ 131 | 18 | |
| 132 ~ 138 | 19 | |
| 139 ~ 145 | 20 | |
| 146 ~ 152 | 21 | |
| 153 ~ 159 | 22 | |
| 160 ~ 166 | 23 | |

FIG. 14a - 2

| IMAGE DATA | LEVEL # | DOT PATTERN |
|---|---|---|
| 167~172 | 24 | |
| 173~179 | 25 | |
| 180~186 | 26 | |
| 187~193 | 27 | |
| 194~200 | 28 | |
| 201~207 | 29 | |

| IMAGE DATA | LEVEL # | DOT PATTERN |
|---|---|---|
| 208~214 | 30 | |
| 215~221 | 31 | |
| 222~228 | 32 | |
| 229~235 | 33 | |
| 236~242 | 34 | |
| 243~249 | 35 | |

| IMAGE DATA | LEVEL # | DOT PATTERN |
|---|---|---|
| 250~256 | 36 | |

FIG. 14b-1

| IMAGE DATA | LEVEL # | THIN | MID | THICK |
|---|---|---|---|---|
| 0 ~ 7 | 0 | | | |
| 8 ~ 15 | 1 | | | |
| 16 ~ 23 | 2 | | | |
| 24 ~ 31 | 3 | | | |
| 32 ~ 39 | 4 | | | |
| 40 ~ 47 | 5 | | | |

| IMAGE DATA | LEVEL # | THIN | MID | THICK |
|---|---|---|---|---|
| 48 ~ 55 | 6 | | | |
| 56 ~ 63 | 7 | | | |
| 64 ~ 71 | 8 | | | |
| 72 ~ 79 | 9 | | | |
| 80 ~ 87 | 10 | | | |
| 88 ~ 95 | 11 | | | |

| IMAGE DATA | LEVEL # | THIN | MID | THICK |
|---|---|---|---|---|
| 192~199 | 24 | | | |
| 200~207 | 25 | | | |
| 208~215 | 26 | | | |
| 216~223 | 27 | | | |
| 224~231 | 28 | | | |
| 232~239 | 29 | | | |

| IMAGE DATA | LEVEL # | THIN | MID | THICK |
|---|---|---|---|---|
| 240~247 | 30 | | | |
| 248~255 | 31 | | | |

HALFTONE IMAGE RECORDING METHOD USING RECORDING DATA HAVING A PLURALITY OF CONCENTRATIONS FOR ONE COLOR

BACKGROUND OF THE INVENTION

1. Field of the Invention

The present invention relates to a halftone image recording method, especially a halftone image recording method using recording dots having a plurality of concentrations for the same color.

2. Related Art

A number of halftone image recording methods used in conventional printers, e.g., an inkjet printer, have been proposed. For example, an analogue modifying method, which varies sizes of ink dots by changing pulse height or pulse width of an electrical signal applied to an inkjet head, a digital modifying method, which varies the number of dots formed in a dot matrix without changing the size of the dots, and a digital and analogue modifying method which is a combination of the analogue and the digital methods and which varies the sizes of the dots and the number of the dots in the dot matrix, are well known. However, the smallest dot formed by the inkjet head is not so small that the density change looks big in the highlight region (low density region), especially in the boundary region between the region having no dots and the region having ink dots. Therefore, in the boundary region, the quality of the image may not be acceptable. In other words, even though the density in the original is constant, the image signal output from the imaging device is not constant because of variations in the input system, e.g., the imaging device, the irradiating conditions, etc. As a result, the ink dots are not recorded uniformly, and the recorded image may look rough. Making the size of the dot matrix larger is proposed to resolve the above-mentioned shortcoming. However, if a large dot matrix is used, the resolution of the image gets worse, and the pattern of the dot matrix is emphasized, and the image quality is not satisfactorily improved after all.

Thus, a halftone image recording method using recording dots having a plurality of concentrations for one color is provided for improving density characteristic in the highlight or boundary regions and for making the number of gradations larger.

However, if only two concentrations of ink for one color are provided, the dot matrix size must be large if it is desired to make the number of gradations larger, considering that ink dots are recorded on the same position over one another. Therefore, the resolution of the image is still not what is desired, and the pattern or the texture of the dot matrix still stands out.

If three or more concentrations of ink are provided for one color, many gradations could be obtained without making the matrix size larger. But there are some shortcomings to such an approach, e.g., increasing the kinds of ink and the number of inkjet heads.

On the other hand, in the case of color image formation, if a plurality of different concentrations of ink are provided for each color, many kinds of ink dots, e.g., cyan thick and thin ink, magenta thick and thin ink, yellow thick and thin ink, are recorded on the same position, and depending on the case, black thick and thin ink may also be recorded on the same position. In this case, the amount of ink recorded on the same position exceeds the capacity of ink accommodation of the recording paper, and there is a possibility that the excess ink may flow on the recording paper.

For the yellow inks, the brightness range of the yellow ink, from the brightness level of white to that of maximum visual saturation of yellow, is narrower than that of cyan or magenta. Therefore, even if the number of concentrations of ink for yellow is increased, the resulting improvement of the image quality is not all that is desired.

In other words, if inks of many concentrations are provided, the required controlling circuit becomes complicated because of the increase in number of the inkjet heads, and the image quality may be degraded as a result of flowing of ink.

SUMMARY OF THE INVENTION

An object of the present invention is to provide a halftone image recording method which overcomes the above-mentioned shortcomings of the conventional methods.

A further object of the present invention is to provide a halftone image recording method which can obtain many gradations without increasing the number and kinds of concentration of dots and the number of recording heads more than necessary.

A further object of the present invention is to provide a color halftone image recording method which overcomes the above-mentioned shortcomings, and which can provide a high quality image using many gradations with a small amount of colorants, without increasing the number of recording heads.

Other features and advantages of the present invention will be apparent from the following description taken in connection with the accompanying drawings wherein.

BRIEF DESCRIPTION OF THE DRAWINGS

FIGS. 5-1 and 5-2 are views illustrating an example of combinations of dot patterns.

FIG. 6 is a view illustrating another example of combinations of dot patterns.

FIG. 11 is a detailed block diagram illustrating a main part of the circuit shown in FIG. 10.

FIG. 12(*a*) is a view showing yellow dot patterns.

FIG. 12(*b*) is a view showing combinations of dot patterns for magenta, cyan and black.

FIGS. 14(a)-1 and 14(a)-2, show another example of yellow dot patterns.

FIGS. 14(b)-1, 14(b)-2 and 14(b)-3, shows another example of combinations of dot patterns for magenta, cyan and black.

DETAILED DESCRIPTION OF THE PREFERRED EMBODIMENTS

Referring to the attached drawings, several embodiments of the present invention will be explained as follows.

Figure 1:
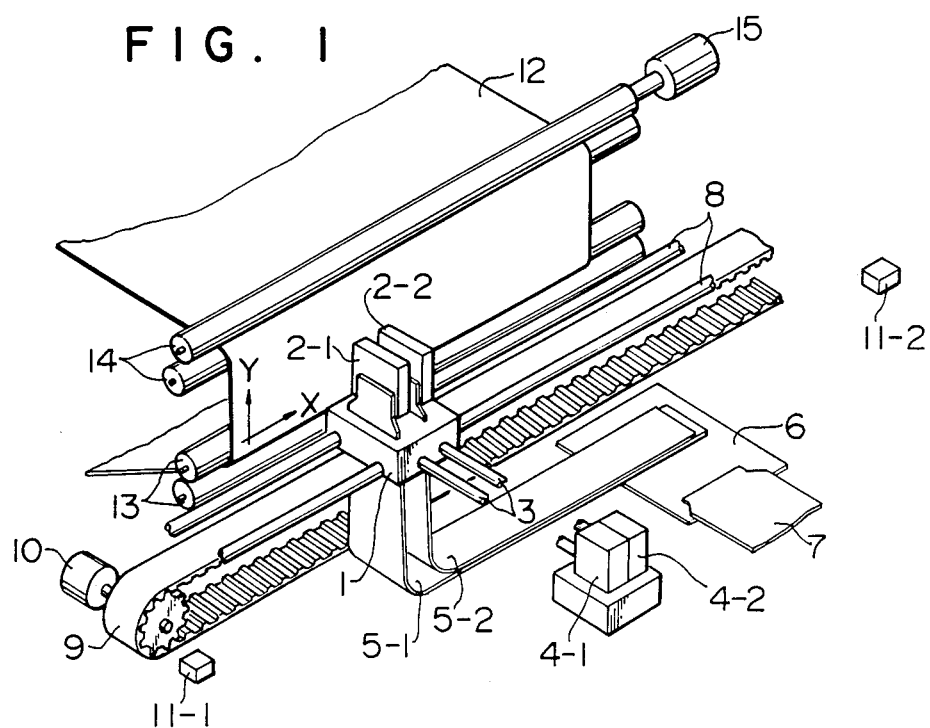
FIG. 1 is a perspective illustration showing a part of an inkjet printer in the first embodiment of the present invention.

FIG. 1 shows an example of an inkjet printer to which the present invention can be applied.

The inkjet printer has a carriage 1 on which a first and a second multi-nozzle head 2-1 and 2-2 are arranged from left to right. The first and second heads respectively emit thick and thin concentration ink (throughout the specification and claims, "ink" is used, for convenience, to denote not only ink in the usual sense but also any material deposited to form an image). Flexible tubes 3 are provided for respectively supplying ink to the first and the second heads 2-1 and 2-2 from ink reservoirs 4-1 and 4-2. Driving signals to the first and the second heads are respectively supplied by plural wires via flexible cables 5-1 and 5-2, a relay terminal board 6 and a common electric power supply cable 7.

The above-mentioned carriage 1 is supported by two rails 8 and fixed on an endless belt 9. The endless belt 9 is driven by a pulse motor 10, so that the carriage 1 can be put into reciprocating motion to perform main scanning in a first direction X.

Two pairs of rollers 13 and 14 are provided for expanding a recording sheet 12, by which is meant, spreading a portion of recording sheet 12 as shown to permit inkjet printing thereon. A motor 15, which is connected to one of the rollers 14, is provided for transporting the sheet 12, to perform sub-scanning in a second direction Y. Thus, by repeating the main scanning and the sub-scanning, an image is formed on the sheet 12 using ink droplets emitted from the multi-nozzle heads 2-1 and 2-2. Stops 11-1 and 11-2 are provided at both ends of reciprocating path of the carriage 1 to define the range of main scanning of the carriage 1.

In this embodiment, each of the multi-nozzle heads 2-1 and 2-2 has 128 nozzles at intervals of 1/16 mm extending straight along a line 8 mm long in the sub-scanning direction Y. Each nozzle has a heating element buried therein. When an electric pulse is supplied to the heating element, a bubble is generated by the resulting heat or thermal energy and pressure due to the bubble causes a droplet to be emitted. This type of inkjet head is well known as a "Bubble Jet" and shown in U.S.P. 4,723,129 and U.S.P. 4,740,796.

Only two heads are shown in FIG. 1 to simplify the explanation, but in order to form a color image, several heads 2 respectively emitting yellow, cyan and magenta thick and thin concentration inks, should be installed (a total of six, for three-color printing).

Figure 2:
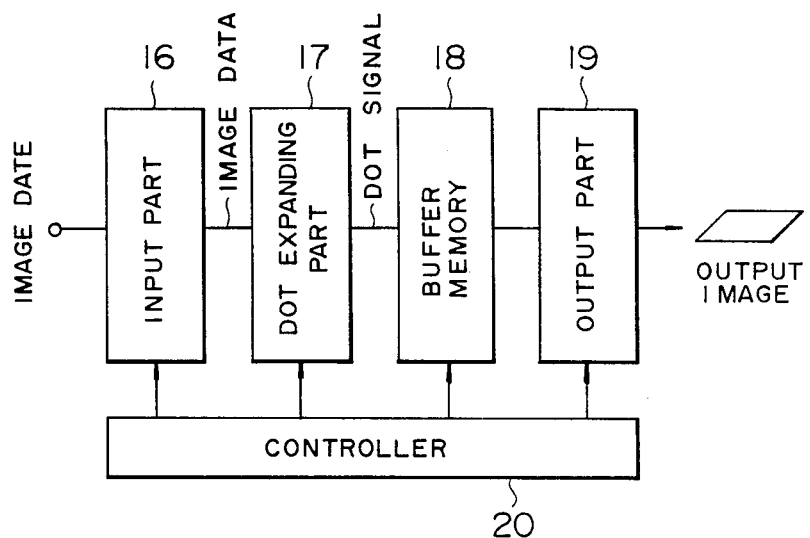
FIG. 2 is a block diagram illustrating an image processing apparatus which converts input image data to dot signals.

FIG. 2 is a block diagram illustrating an image processing apparatus which converts input image data to driving signals to drive the heads 2-1 and 2-2 of the inkjet printer.

Referring to FIG. 2, the image processing apparatus has an input part 16 for inputting image data, a dot expanding part 17 for expanding the image data to binary data which represents for each possible dot location, whether a dot is to be formed or not, for each concentration ink, a buffer memory 18 for storing the binary data from the expanding part 17, an output part 19 for forming an image by supplying the binary data to the heads 2-1 and 2-2 to emit the ink droplets in accordance with the binary data, and a controller 20 for controlling all of the image processing apparatus (parts 16–19).

Figure 3:
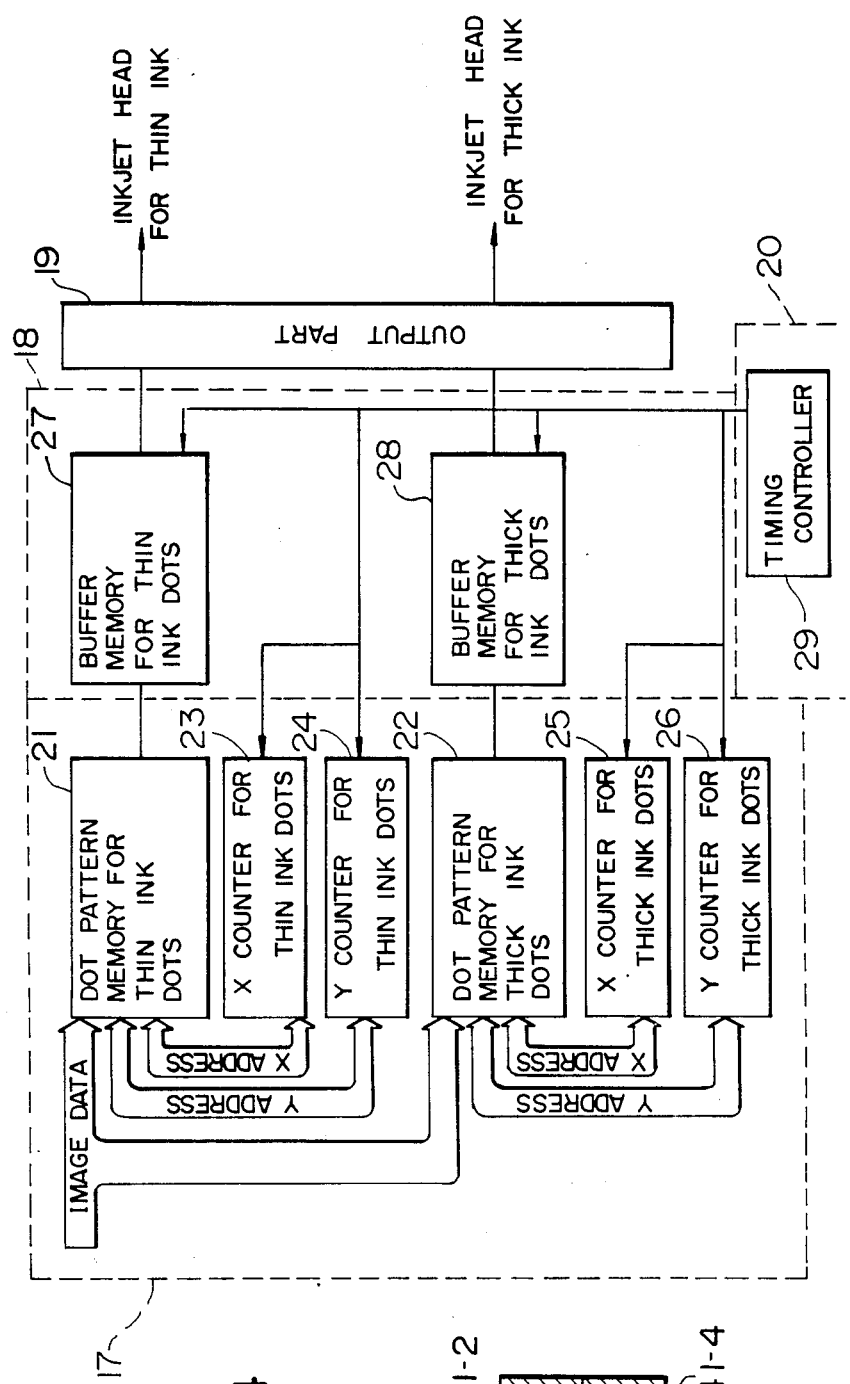
FIG. 3 is a detailed diagram illustrating the main part of FIG. 2.

FIG. 3 is a block diagram illustrating the detailed structure of the dot expanding part 17 and the buffer memory 18.

In FIG. 3, a dot pattern memory 21 for thin ink, a dot pattern memory 22 for thick ink, X and Y address counters 23 and 24 for thin ink, X and Y address counters 25 and 26 for thick ink, a buffer memory 27 for thin ink and a buffer memory 28 for thick ink are provided. The dot pattern memory is addressed by the image data from the input part 16 and by X and Y addresses designated by the X and Y address counters 23 and 24 for thin ink. The binary data for thin ink in the dot pattern memory 21 addressed by the image data and the X and Y addresses, is output and stored in the buffer memory 27 for thin ink.

Similarly, the dot pattern memory 22 for thick ink is addressed by the image data from the input part 16 and by X and Y addresses designated by the X and Y address counters 25 and 26 for thick ink, and the binary data for thick ink in the dot pattern memory 22 addressed by the image data and the X and Y addresses, is output and stored in the buffer memory 28 for thick ink.

A timing controller 29, which is included in the controller 20, is provided for generating timing signals, e.g., main synchronizing and sub-synchronizing signals.

Figure 4:
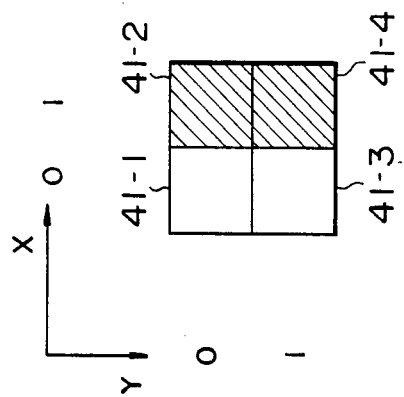
FIG. 4 is a view illustrating a relationship of a dot matrix and X and Y addresses thatof.

FIG. 4 shows a relationship between a dot pattern stored in the dot pattern memories 21 and 22 and X and Y addresses, for example a 2×2 dot matrix.

Assuming the X and Y directions as shown in FIG. 4, an address of a dot 41-1 is represented as X=0 and Y=0, that of a dot 41-2 is represented as X=1 and Y=0, that of a dot 41-3 is represented as X=0 and Y=1, and that of a dot 41-4 is represented as X=1 and Y=1. The values of the dots 41-1 and 41-3 are "0", that is they represent areas where ink dots should not be formed. On the other hand, the values of the dots 41-2 and 41-4 are "1", i.e., they represent areas where ink dots should be formed.

The X and Y directions shown in FIG. 4 do not necessarily correspond to the X and Y directions of the scanning of the printer shown in FIG. 1.

The relationship between dot patterns generated by the address counters and addresses of the buffer memory for storing the generated dot patterns is well known, for example, as shown in the Japanese Laid-Open Patent Publication No. 61-108255, which corresponds to U.S. Patent 4,686,538. Therefore, the explanation of methods for storing the generated dot patterns in the buffer memory is omitted.

FIG. 5 shows an example of relationships between input image data and dot patterns in the dot pattern memories 21 and 22. The size of the dot pattern matrix for thin ink is 6×6, and that for thick ink 3×3. The thin ink per se represents no more than 37 gradation levels. The thick ink per se can represent 10 gradation levels at most. But, by combining the thin and thick ink, namely by combining the dot patterns for the thin and thick ink, 68 gradation levels can be obtained.

The arrangement of dot patterns is decided as follows. First, all combinations of dot patterns of thin ink dots (37 levels) and thick ink dots (10 levels) are recorded, and the optical reflective density (O.D.) values of each of the combinations is measured. Then, all combinations are lined up in the order of their O.D. value, and input image data is corresponded with the combinations of dot patterns so that the chosen arrangement of dot patterns has a linear relationship with O.D. value.

Further, in gradation levels "0" to "36", namely in the low density area, only the thin ink dots are used. After all cells or elements of the 6×6 dot matrix are occupied by the thin ink dots, namely in the gradation levels over "36", the thick ink dots should be formed. And in the middle and high density regions, the higher the gradation level, the more thick ink dots in the 3×3 dot matrix are to be used, and fewer thin ink dots in the 6×6 dot matrix are to be used. In the highest density level, "67", only the thick ink dots are formed in the dot matrix.

FIG. 6 shows a part of another example of a practical relationship between input image data and dot patterns of thin and thick ink dots. In this example, the size of the dot pattern matrix for the thin ink dots is 6×6, and that for the thick ink dots is 4×4. Therefore, the thin ink dots can represent 37 gradation levels the same as in the first example shown in FIG. 5. On the other hand, the thick ink dots can represent 17 gradation levels at most. With the resulting chosen combinations of thin and thick ink dots, 81 gradation levels can be obtained. The manner of deciding the dot patterns in FIG. 6 is the same as in the first example, in FIG. 5.

Figure 8:
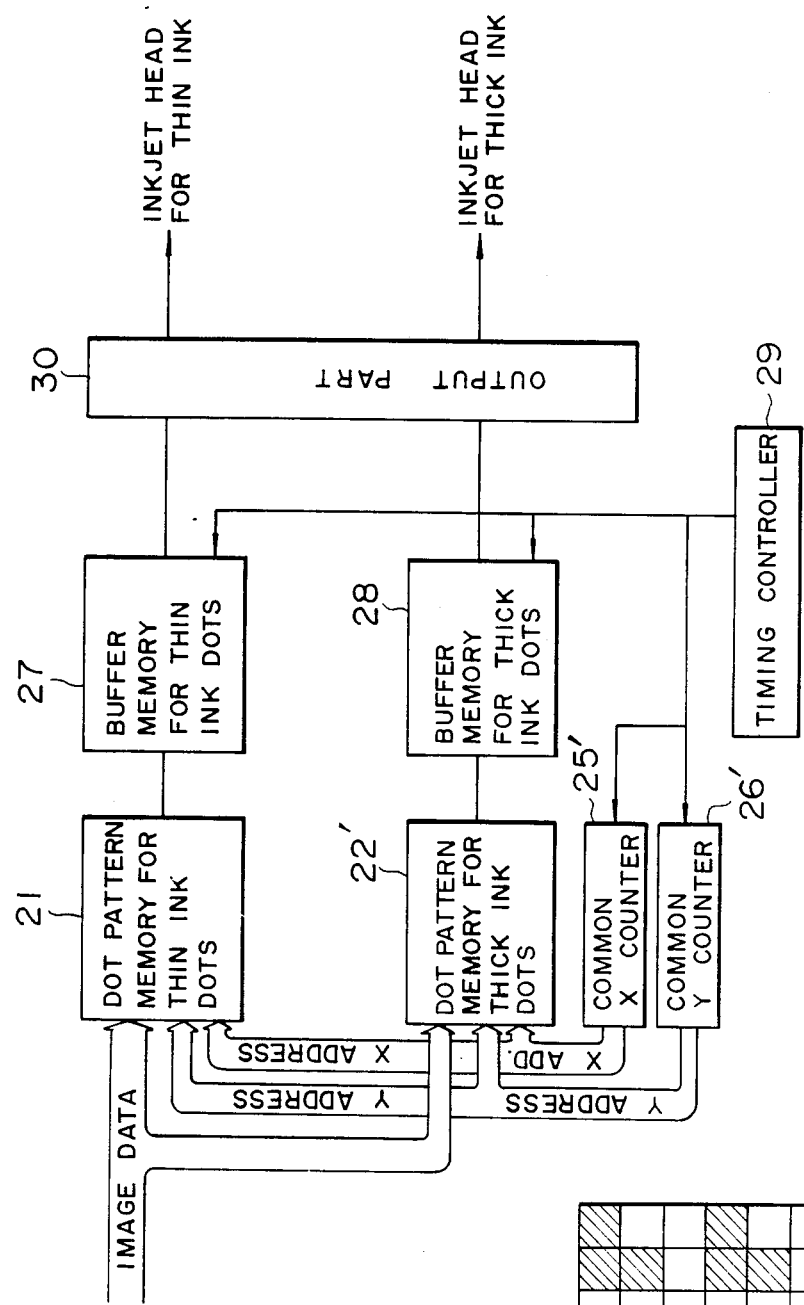
FIG. 8 is a block diagram showing a modification in which X and Y counters are used in common for thin and thick ink.
Figure 7:
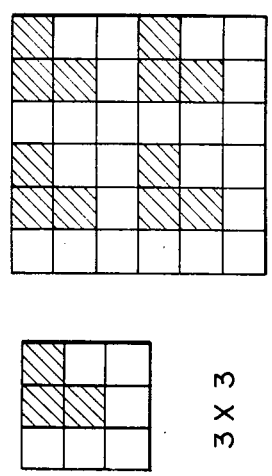
FIG. 7 is a view illustrating a relationship between a 3×3 dot matrix and a 6×6 dot matrix.

As shown in FIG. 7, if a 3×3 dot matrix for the thick ink dots in the first example is replicated, and arranged with two of the 3×3 matrices in each of two rows in the X and Y directions, a 6×6 dot matrix is made, and the size of the dot matrix for the thick ink dots becomes the same as that for the thin ink dots. As a result, as shown in FIG. 8, the same X and Y address signals from common X and Y counters 25', 26' can be used to access both dot pattern memories 21 and 22'. With this arrangement, therefore, it is not necessary to install separate address counters respectively for the thin ink dots and the thick ink dots. As a result, the structure of the apparatus is simplified. More generally, let the size of the thin ink dot matrix be assumed to be Nu×Nu, and that of the thick ink dot matrix Nk×Nk. If Nu equals n×Nk (where n=2, 3, 4 ...), the same X and Y address signals can access the dot pattern memories both for the thin ink dots and for the thick ink dots, by arranging N×N matrices n times in the X and Y directions. Further, this permits timing control for dot expanding point to be simplified.

As mentioned above, according to the first embodiment, wherein a plurality of concentrations of ink are provided and the size of the dot matrix for thin ink is set to be larger than that for thick ink, the number of gradation levels increases, and the texture, or the pattern of the dot matrix, does not stand out so much. Especially in the highlight or boundary regions, the pattern of the dot matrix does not stand out, and the number of the gradation levels is larger. Therefore, by virtue of the first embodiment, the quality of the image is getting improved.

The second embodiment will now be explained.

Figure 9:
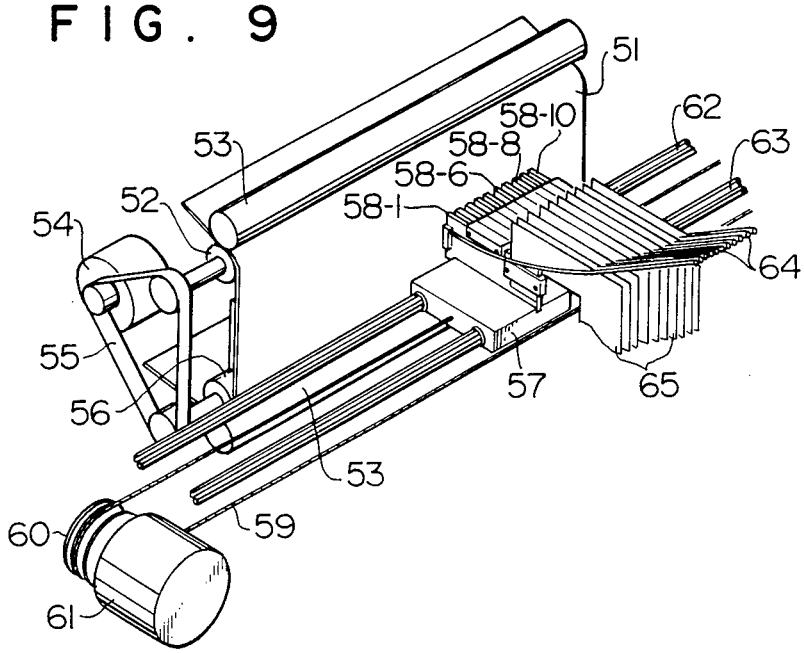
FIG. 9 is a perspective view showing a part of an inkjet printer in a second preferred embodiment of the invention.

FIG. 9 shows an inkjet printer of the second embodiment. The inkjet printer prints on a recording sheet 51, which the printer transports by means of transporting rollers 52 and 56 which transports the sheet 51 in the sub-scanning direction while holding the sheet 51 in cooperation with respective rubber rollers 53. A pulse motor 54 drives the rollers 52 and 56 via a driving belt 55. A carriage 57 has a plurality of recording heads 58-1 through 58-8, and is driven by a head drive motor 61 via a wire 59 and a pulley 60 for reciprocative motion on a pair of rails 62 and 63, to scan in the main scanning direction.

A plurality of ink tubes 64 are provided for supplying ink the the recording heads 58-1 through 58-8. A plurality of flexible cables 65 are also provided for applying driving signals to the recording heads 58-1 through 58-10. Each of the recording heads 58-1 through 58-10 has 128 nozzles, at intervals of 1/16 mm, extending along a straight line 8 mm in length in the sub-scanning direction. Each nozzle is driven by a driving electric pulse applied from the corresponding flexible cable 65. Each nozzle has a heating element buried therein, and when the electric pulse is applied to the heating element, a bubble is generated by the resulting heat or thermal energy, and the pressure due to the bubble causes an ink droplet to be emitted. This type of inkjet head, as mentioned above, is that which is well known as the "Bubble Jet" and shown in U.S.P. 4,723,129 and U.S.P. 4,740,796.

In this embodiment, the 10 inkjet heads include a yellow head 58-1, three magenta heads 58-2 through 58-4, three cyan heads 58-5 through 58-7, and three black heads 58-8 through 58-10. Each of the three magenta, cyan and black heads include a thin concentration ink ("Thin") head 58-2, 58-5 and 58-8, a middle concentration ink ("Mid") head 58-3, 58-6 and 58-9 and a thick concentration ink ("Thick") head 58-4, 58-7 and 58-10. The relationship of the concentration of ink used in the Thin, Mid and Thick heads is as follows:

(Thick)>(Mid)>(Thin)

These heads 58-1 through 58-10 are arranged, as shown, along a line in the main scanning direction.

Figure 10:
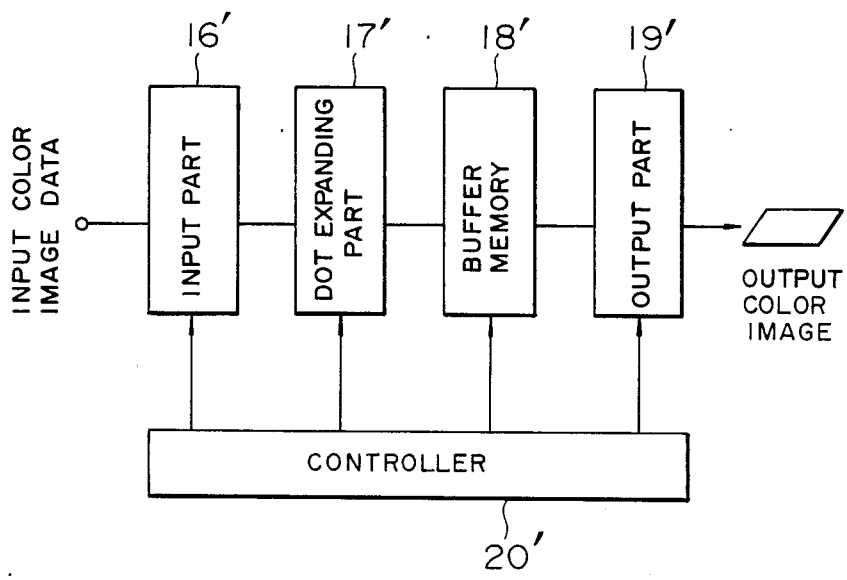
FIG. 10 is a block diagram illustrating a color image processing apparatus which converts input color image data to dot signals.

FIG. 10 is a block diagram illustrating an image processing apparatus the same in most respects as that shown in FIG. 2. In FIG. 10, the image processing apparatus has an input part 16' for inputting color image data, a dot expanding part 17' for respectively expanding the color image data to binary data representing formation or non-formation of a dot, for each of ink heads 58-1 though 58-10, a buffer memory 18' for storing the binary data from the expanding part 17', an output part 19' for forming an image by applying the binary data to the heads 58-1 through 58-10 to emit ink droplets in accordance with the binary data, and a controller 20' for controlling all of the color image processing apparatus (parts 16' through 19').

FIG. 11 shows a block diagram illustrating the detailed structure of the dot expanding part 17' and the buffer memory 18' in FIG. 10.

In FIG. 11, a dot pattern memory 121 for yellow, a dot pattern memory 122 for magenta, a dot pattern memory 123 for cyan and a dot pattern memory 124 for black are provided. X and Y counters 125 and 126 are provided for the yellow dot pattern memory, and another set of X and Y counters 127 and 128 is provided commonly for the magenta, cyan and black dot pattern memories 122, 123 and 124. A buffer memory 129 for yellow ink is provided. On the other hand, three buffer memories 130 through 138 are provided for each of magenta, cyan and black.

The yellow dot pattern memory 121 is accessed by the yellow image data from the input part 16' and by X and Y addresses from X and Y counters 125 and 126, the binary data for the yellow ink in the dot pattern memory 121 addressed by the yellow image data and the X and Y addresses, is output and stored in the yellow buffer memory 129.

On the other hand, the magenta, cyan and black dot pattern memories 122, 123, and 124 are each accessed by the corresponding color image data and by the common X and Y address counters 127 and 128, which are different from the X and Y counters 125 and 126 for yellow. Then the binary data for each concentration ink for each color in the dot pattern memories 122, 123 and 124 is output and stored in the respective buffer memory 130 through 138 for the corresponding ink concentration and color. Each of the dot pattern memories 122, 123 and 124 generates different dot patterns for each concentration ink, but generates them simultaneously.

A timing controller 139, which is included in the controller 20' shown in FIG. 10, is provided for generating timing signals.

The relationship between a dot pattern stored in the dot pattern memories 121 through 124 and X and Y addresses is the same as that described above in connection with FIG. 4, regarding the first embodiment. Since the relationship between dot pattern generated by the address counters and addresses of the buffer memory for storing the binary data is well known, as above mentioned, the explanation of this matter is omitted.

Figure 12A:
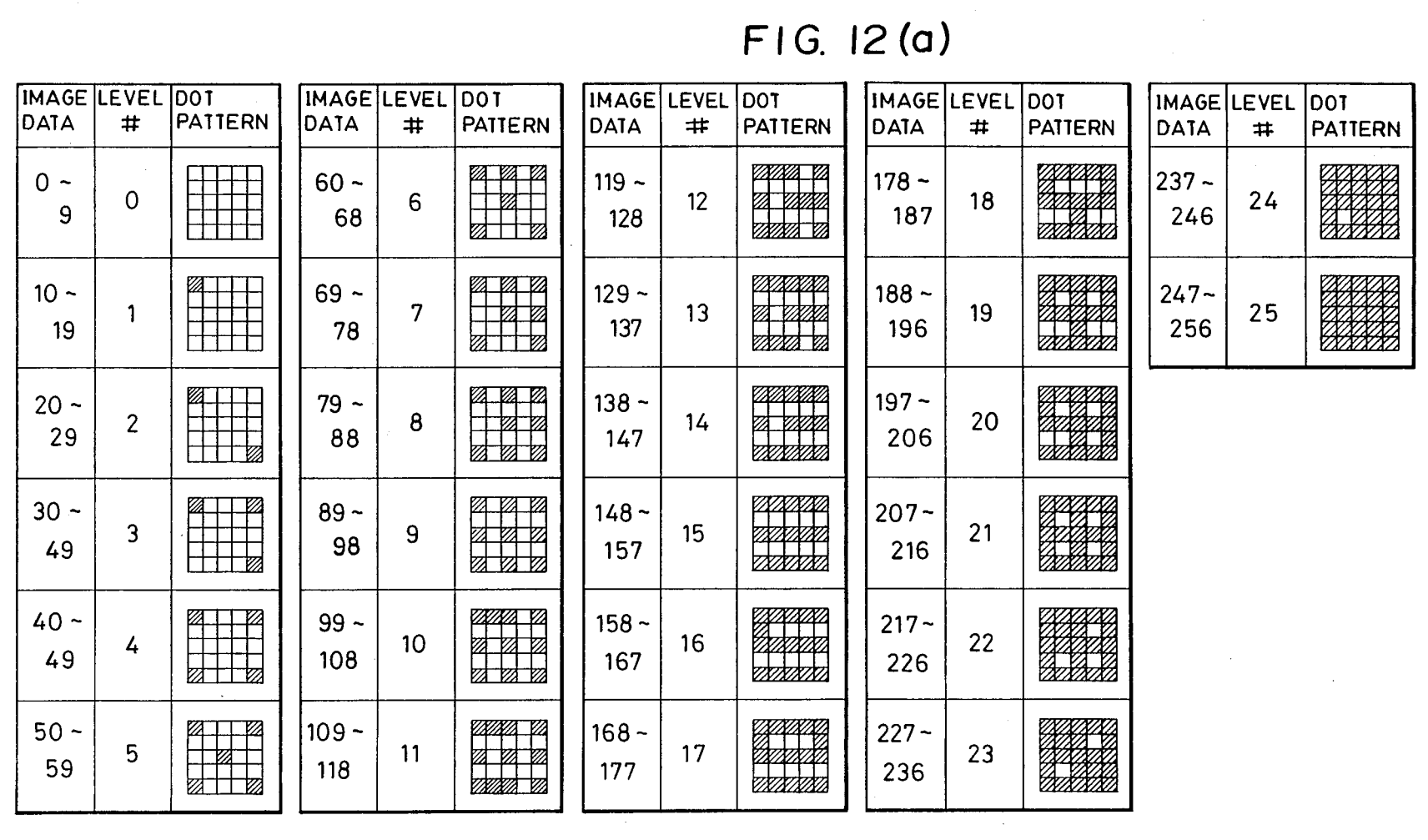

FIG. 12 shows an example of relationships between input color image data and dot patterns in the dot pattern memories. FIG. 12(a) shows dot patterns for yellow, these patterns being represented by 5×5 dot matrix. Therefore, 26 gradation levels for yellow can be represented in this embodiment, and the X and Y address counters 125 and 26 can be structured by five-counters.

Figure 12B:
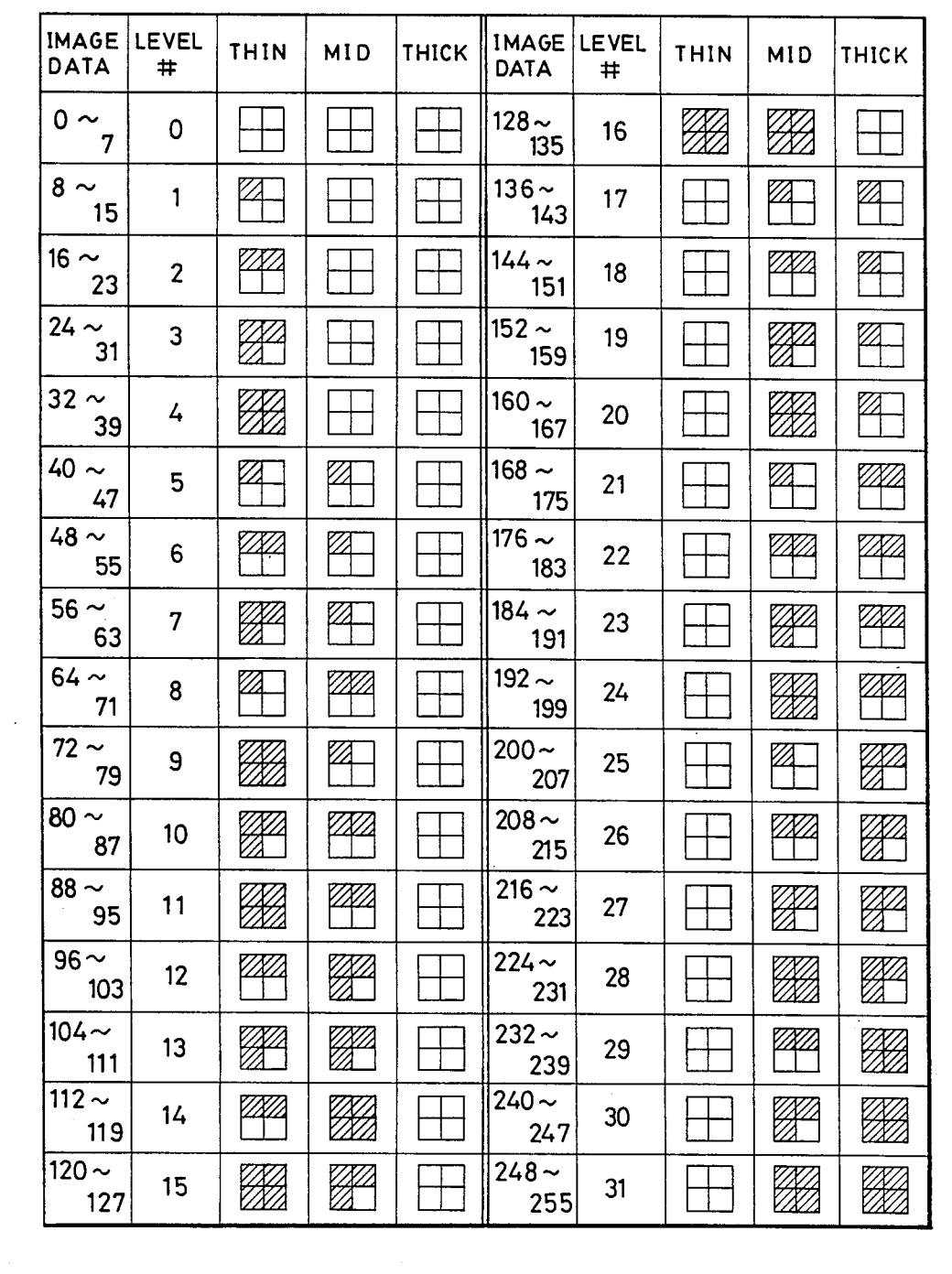

FIG. 12(b) shows dot patterns for magenta, cyan and black, these patterns having three dot patterns for each color, i.e., a Thin dot pattern, a Mid dot pattern and a Thick dot pattern. Each of these patterns is structured by a 2×2 dot matrix. 32 gradation levels for each color can be represented by using three different-concentration inks in this embodiment.

The manner of deciding the arrangement of dot patterns for yellow is different from that for cyan, magenta and black.

For yellow, one 5×5 matrix can express just 26 patterns. All 26 patterns are recorded, and the luminance or the O.D. value of each pattern is measured. Then all the patterns are lined up in the order of their O.D. value, and each of dot patterns is corresponded with the input image data so that the arrangement of dot patterns has a linear relationship with the O.D. values. That is, the input image data, which has a linear relationship with the luminance of an original and which is read by a reader, is corresponded to the O.D. value. Then, all patterns are corresponded to the image data so that the gradation levels of the original are matched to those of the printed output image.

On the other hand, the manner of deciding the arrangement of dot patterns for colors other than yellow, is as follows.

First, all patterns using only Thin dots, all combinations of dot patterns using Thin dots and Mid dots, and all combinations of dot patterns using Mid dots and Thick dots, are recorded, and the O.D. values of each of these dot patterns is measured. Then, in the low density region (in this embodiment, O.D. value 0 to 0.9), dot patterns using only Thin dots or combinations of Thin dots and Mid dots are selected. In the high density region (in this embodiment, O.D. value 0.9 to 1.7), combinations of Mid dots and Thick dots are selected.

Similarly to yellow, each of the patterns or combinations is corresponded to the image data, so that the luminance of each of patterns or combinations has a linear relationship with the image data.

The combinations of dot patterns in FIG. 12(b) correspond to the image data at uniform intervals. However, they should preferably be corresponded to the image data at different intervals in accordance with characteristics of the reader or the printer.

Thus, dot patterns or combinations of dot patterns corresponding to the input color image data can be obtained. Then dot patterns or combinations of dot patterns are stored in the dot pattern memories 121 through 124.

These memories are accessed by the value of the image data so that dot patterns or combinations of dot patterns are output from the memories 121 through 124.

For example, if yellow image data "160", magenta data "85", cyan data "120" and black data "20" are respectively input to the corresponding dot pattern memories 121 through 124, the dot pattern of yellow should be selected to be level "16", the combination of the dot patterns of magenta should be selected to be level "10", that of cyan should be selected level "15" and that of black should be selected to be level "2". Then the dot pattern or the combination of the dot patterns designated by the image data is properly formed on the recording sheet.

Another example of dot patterns and combinations is described below.

Figure 13:
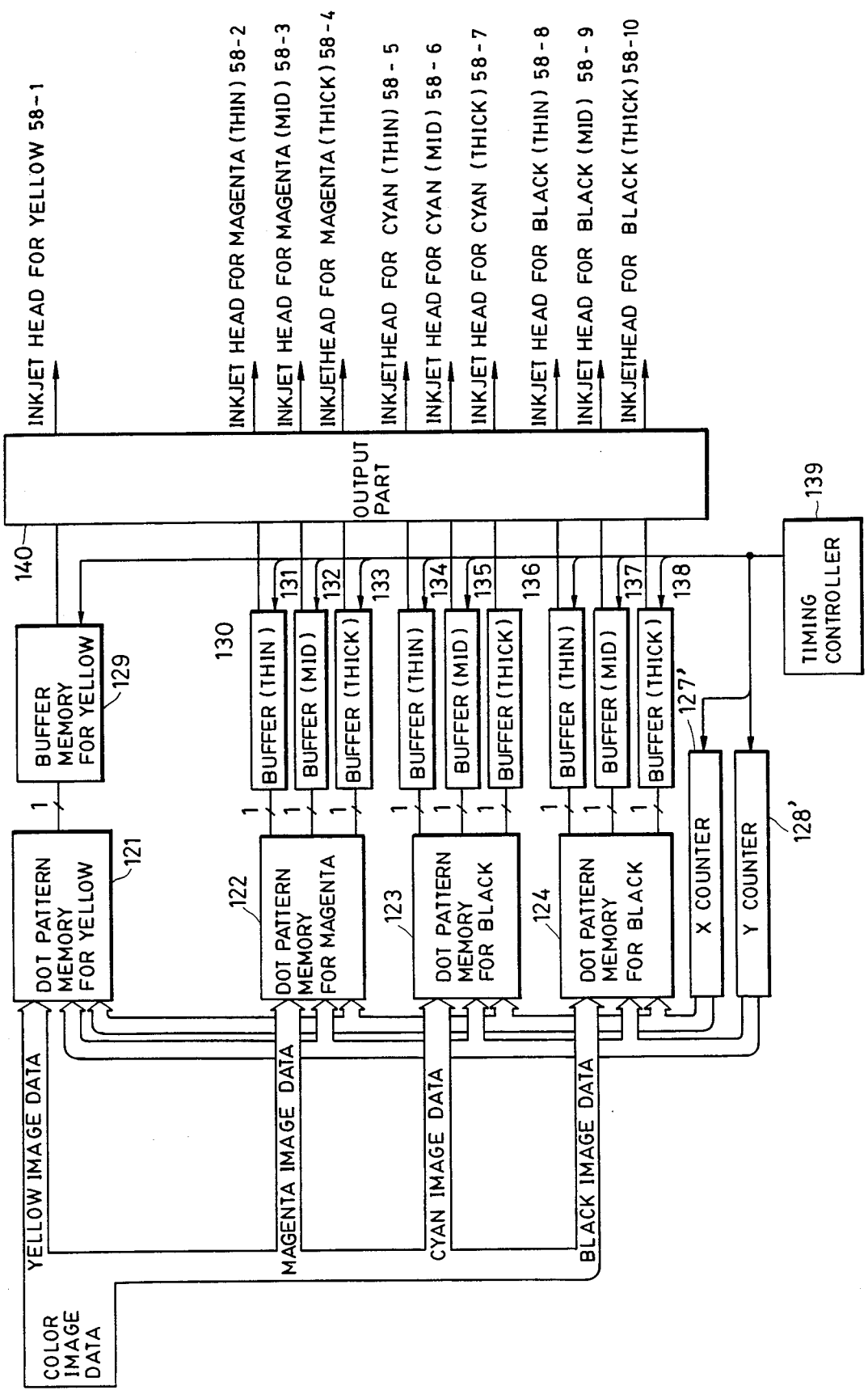
FIG. 13 is a block diagram showing a modification in which X and Y counters are used in common for yellow ink and ink of another color.

In this example, the size of the yellow dot matrix is an integral number of times bigger than that of the magenta, cyan and black matrices. Namely, assuming the yellow dot matrix is a Dy×Dy matrix, and each of the magenta, cyan and black matrices is Dcmk×Dcmk, the following equation can be set:

$$Dy = n \times Dcmk$$

where n is an integer greater than 1. Then, the dot expanding part in FIG. 11 can be simplified as shown in FIG. 13. In FIG. 13, X and Y address counters 127' and 128' designating X and Y addresses are commonly used for not only yellow but other colors without installing counters for yellow. These X and Y counters 127' and 128' have merely to count Dy repeatedly.

Figure 14B-2:
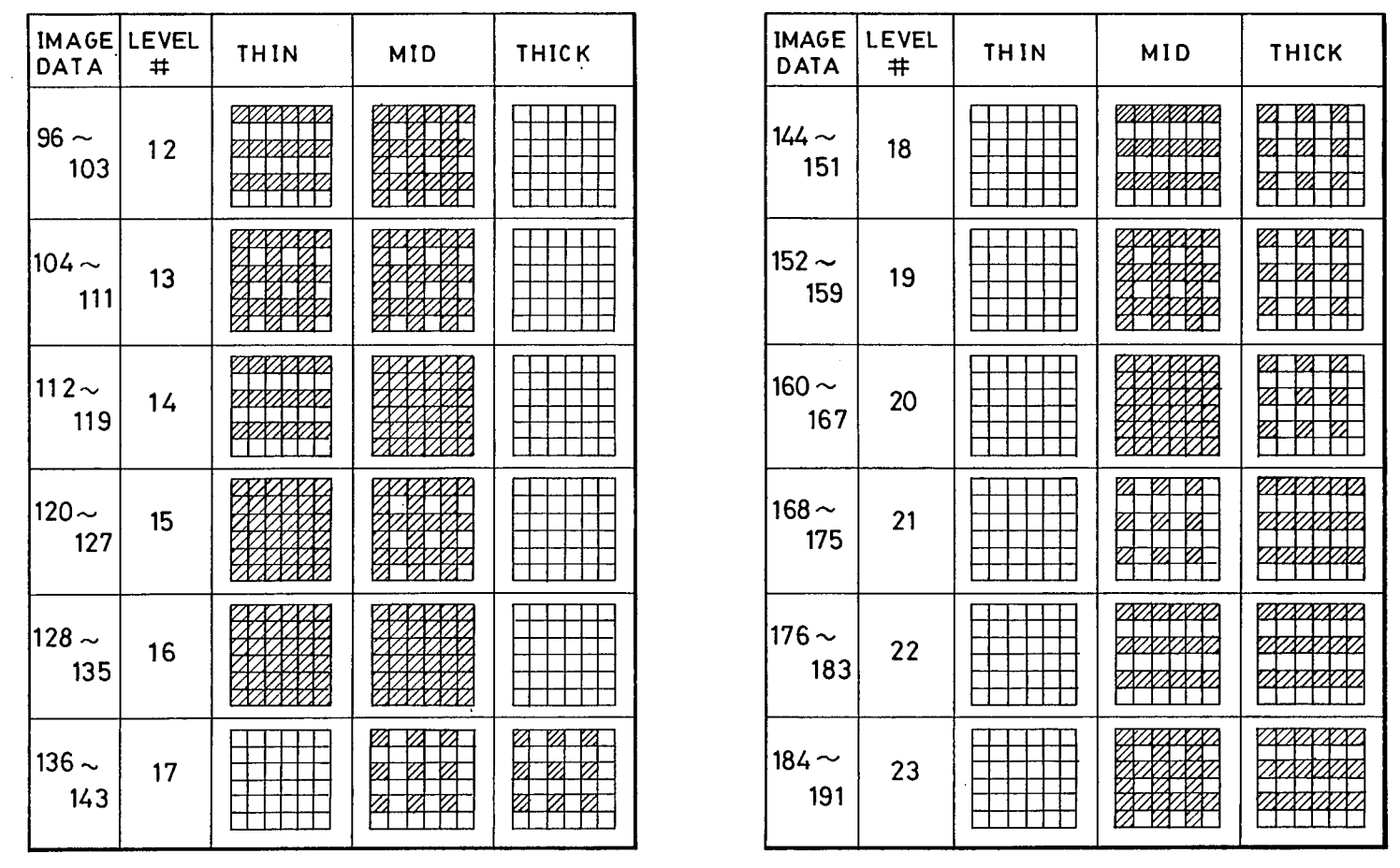

FIG. 14(a) shows dot patterns for yellow, whose matrix size is 6×6 and which can express 37 gradation levels. FIG. 14(b) shows combinations of dot patterns for colors other than yellow, whose matrix size is 2×2, the same as in the above example, and which can express 32 gradation levels, also the same as that example.

Therefore, arranging nine replications of each of the cyan, magenta and black dot matrix three times in each of X and Y directions, a 6×6 dot matrix for each of these colors is obtained, which is equal in size to the yellow dot matrix. Then if the counters 127' and 128' are structured as six resettable counters, the outputs of the counters 127' and 128' can access not only the yellow dot pattern memory but the cyan, magenta and black dot pattern memories. In addition, this permits the timing controller 139 to be simplified.

As mentioned above, according to the second embodiment, the texture or the dot pattern does not stand out so much, and the required number of kinds of ink or heads can be decreased despite the number of gradation levels being almost the same for each color.

Further, only one kind of ink is used for yellow, and therefore the amount of ink applied in one element in the dot matrix is reduced, and the amount does not excede the capacity of the recording paper. Therefore, the quality of the output color image is good.

In this embodiment, dots of ink of only one concentration are used for yellow, but when the number of concentrations is set to Nm for magenta, Nc for cyan, and Ny for yellow, if the following relationship is satisfied, the number of heads can be reduced and the output color image will have a good quality:

$$Ny < Nc, Nm$$

The first and second embodiments have been described with reference to the digital modifying method, but the present invention applies also to the digital and analogue modifying method.

And, a combination of the first and second embodiments can be provided. In such combination, only one concentration of ink dot is provided for yellow, but a plurality of concentration ink dots are provided for other colors, and for these other colors, the size of the thin ink dots is set to be larger than that of the thick ink dot.

Further, the invention can apply to other types of printer than the inkjet printer, e.g., a thermal transfer printer or electrophotographic printer. More specifically, the present invention can apply to all printers which represent density by using dots or colorants. As mentioned above, according to the present invention, without increasing the number of recording heads or of concentrations of colorants, the image quality is improved, and the texture or pattern of dot matrix does not stand out so much.

Therefore, high quality images can be obtained without using many recording heads or many kinds of concentration colorants.

Although particular embodiments of the present invention are herein disclosed for purposes of explanation, various modifications thereof, after study of this specification, will be apparent to those skilled in the art to which the invention pertains, and the scope of the invention is therefore not to be limited by the details illustratively described herein, but is to be defined by the terms of the appended claims.

What is claimed is:

1. A halftone image recording method for recording an image by forming dots in unit areas on a recording medium, the method comprising the steps of:
   forming an image using, for one color, at least two kinds of dots respectively having different concentrations, one of said kinds being thin-concentration dots and the other of said kinds being thick-concentration dots; and
   setting a size of unit area for the thin-concentration dots larger than a size of unit area for the thick-concentration dots for the one color.

2. A halftone image recording method according to claim 1, wherein each unit area includes $n \times m$ cells in which dots may be formed.

3. A halftone image recording method according to claim 2, wherein the size of the unit area for thin-concentration dots is an integral number of times larger than the size of the unit area for thick-concentration dots.

4. A halftone image recording method according to claim 1, wherein the thin-concentration dots, only are used for forming an element of the image having a density lower than a predetermined density.

5. A halftone image recording method according to claim 1, wherein both thin-concentration dots and thick-concentration dots are used for expressing medium and high density.

6. A halftone image recording method according to claim 5, wherein, the higher the density, the fewer the thin-concentration dots per picture element.

7. A halftone image recording method according to claim 6, wherein the thick-concentration dots, only, are used for expressing densities over a second predetermined density.

8. A halftone image recording method according to claim 1, wherein said dots are formed by means of an inkjet head.

9. A halftone image recording method according to claim 8, wherein said inkjet head discharges a droplet by thermal energy.

10. A color image recording method for recording a color image by forming dots in a unit area on a recording sheet, the method comprising the steps of:
    providing means for forming on the recording sheet a plurality of kinds of dots, including, for each of a plurality of colors, at least one kind, each kind of dots having a respective concentration; wherein numbers of concentrations are, respectively, Nm for magenta, Nc for cyan and Ny for yellow, satisfying the following relationship $$Ny < Nm, Nc;$$

setting a size of unit area for yellow dots larger than a size of unit area for other colors; and
    operating the dot-forming means to form dots on the recording sheet.

11. A color image recording method according to claim 10, wherein Ny equals 1.

12. A color image recording method according to claim 10, wherein each unit area includes $n \times m$ cells in each of which a dot may be formed.

13. A color image recording method according to claim 12, wherein the size of the unit area for said other colors is an integral number of times larger than the size of the unit area for yellow dots.

14. a color image recording method according to claim 10, further comprising a step of setting a size of unit area for thin-ink dots of said other colors larger than a size of unit area for thick-ink dots of said other colors.

15. A color image recording method according to claim 10, wherein said providing step includes providing means for forming black dots for expressing a black cmponent.

16. A color image recording method according to claim 10, wherein the dot-forming means comprises an inkjet head.

17. A color image recording method according to claim 16, wherein said inkjet head discharges a droplet by thermal energy.

* * * * *

UNITED STATES PATENT AND TRADEMARK OFFICE
CERTIFICATE OF CORRECTION

PATENT NO. : 4,860,026
DATED : August 22, 1989
INVENTOR(S) : KENTARO MATSUMOTO, ET AL.

It is certified that error appears in the above-identified patent and that said Letters Patent is hereby corrected as shown below:

ON THE TITLE PAGE,
IN [56] REFERENCES CITED

U.S. PATENT DOCUMENTS, "4,531,731  11/1985  Kawamura" should read --4,553,173  11/1985  Kawamura--.

SHEET 1 OF 16

FIG. 2, "IMAGE DATE" should read --IMAGE DATA--.

COLUMN 2

Line 36, "wherein" should be deleted.
    Line 48, "thatof." should read --thereof.--.

COLUMN 3

Line 6, "shows" should read --show--.

COLUMN 9

Line 11, "excede" should read --exceed--.

UNITED STATES PATENT AND TRADEMARK OFFICE
CERTIFICATE OF CORRECTION

PATENT NO. : 4,860,026

DATED : August 22, 1989

INVENTOR(S) : KENTARO MATSUMOTO, ET AL.

It is certified that error appears in the above-identified patent and that said Letters Patent is hereby corrected as shown below:

COLUMN 10

Line 7, "only are" should read --only, are--.
    Line 53, "a" should read --A--.
    Line 61, "cmponent." should read --component.--.

Signed and Sealed this

Twenty-fifth Day of August, 1992

Attest:

DOUGLAS B. COMER

Attesting Officer      Acting Commissioner of Patents and Trademarks